United States Patent
Bunel et al.

(10) Patent No.: US 11,731,315 B2
(45) Date of Patent: Aug. 22, 2023

(54) PREFORM FOR A CONTAINER MADE OF PLASTIC MATERIAL

(71) Applicant: SIDEL PARTICIPATIONS, Octeville-sur-Mer (FR)

(72) Inventors: Christophe Bunel, Octeville-sur-Mer (FR); Laurent Naveau, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 91 days.

(21) Appl. No.: 17/272,993

(22) PCT Filed: Aug. 13, 2019

(86) PCT No.: PCT/FR2019/051921
§ 371 (c)(1),
(2) Date: Mar. 3, 2021

(87) PCT Pub. No.: WO2020/049235
PCT Pub. Date: Mar. 12, 2020

(65) Prior Publication Data
US 2021/0323195 A1     Oct. 21, 2021

(30) Foreign Application Priority Data
Sep. 4, 2018  (FR) .................................. 1857911

(51) Int. Cl.
*B29B 11/14*  (2006.01)
*B29K 67/00*  (2006.01)
*B29K 105/00*  (2006.01)

(52) U.S. Cl.
CPC ........ *B29B 11/14* (2013.01); *B29C 2949/078* (2022.05); *B29C 2949/0725* (2022.05); *B29C 2949/0856* (2022.05); *B29K 2067/003* (2013.01); *B29K 2105/253* (2013.01)

(58) Field of Classification Search
CPC ............. B29B 11/14; B29C 2949/0725; B29C 2949/0856; B29C 49/06; B29C 2949/078; B29C 49/071; B29K 2067/003; B29K 2105/253
See application file for complete search history.

(56) References Cited

FOREIGN PATENT DOCUMENTS

| DE | 102013011315 A1 | 1/2015 |
| EP | 2316626 A1 | 5/2011 |
| GB | 2048757 A1 | 12/1980 |
| JP | S54146870 A1 | 11/1979 |
| WO | 9004543 A1 | 5/1990 |
| WO | 2010027667 A1 | 3/2010 |
| WO | 2011045739 A1 | 4/2011 |

OTHER PUBLICATIONS

International search report dated Oct. 25, 2019.

*Primary Examiner* — Monica A Huson

(57) ABSTRACT

The invention concerns a preform for a container made of plastic material, comprising a cylindrical body that extends along an axis of revolution of the preform and a bottom that closes the cylindrical body. The bottom has an outer profile with a central portion and a curved portion joining the central portion to the cylindrical body. The central portion has, in longitudinal cross-section, a first concave section. The curved portion has successively, in longitudinal cross-section, from the first concave section towards the cylindrical body, a first convex or frustoconical section, a second concave section and a second convex or frustoconical section.

17 Claims, 2 Drawing Sheets

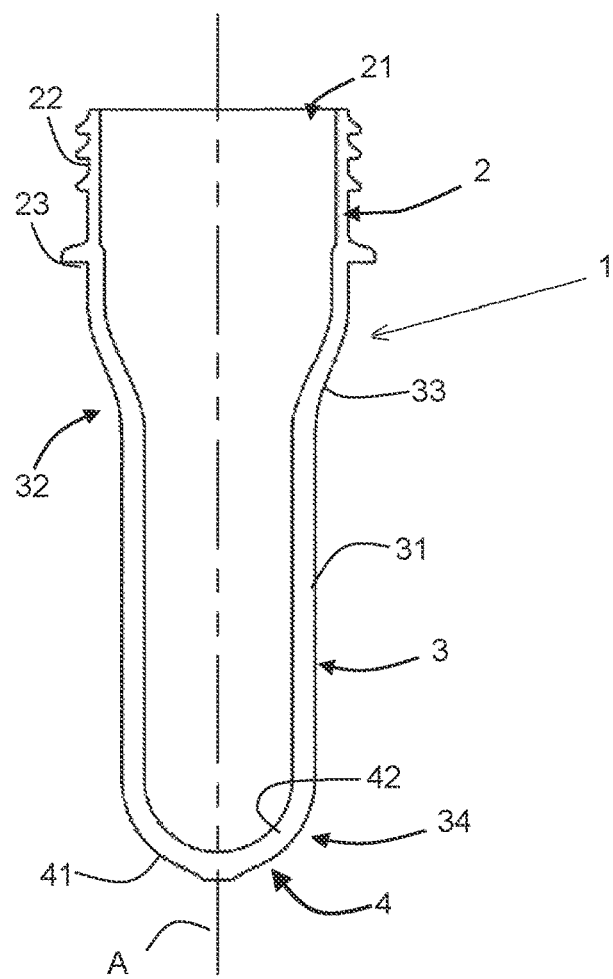
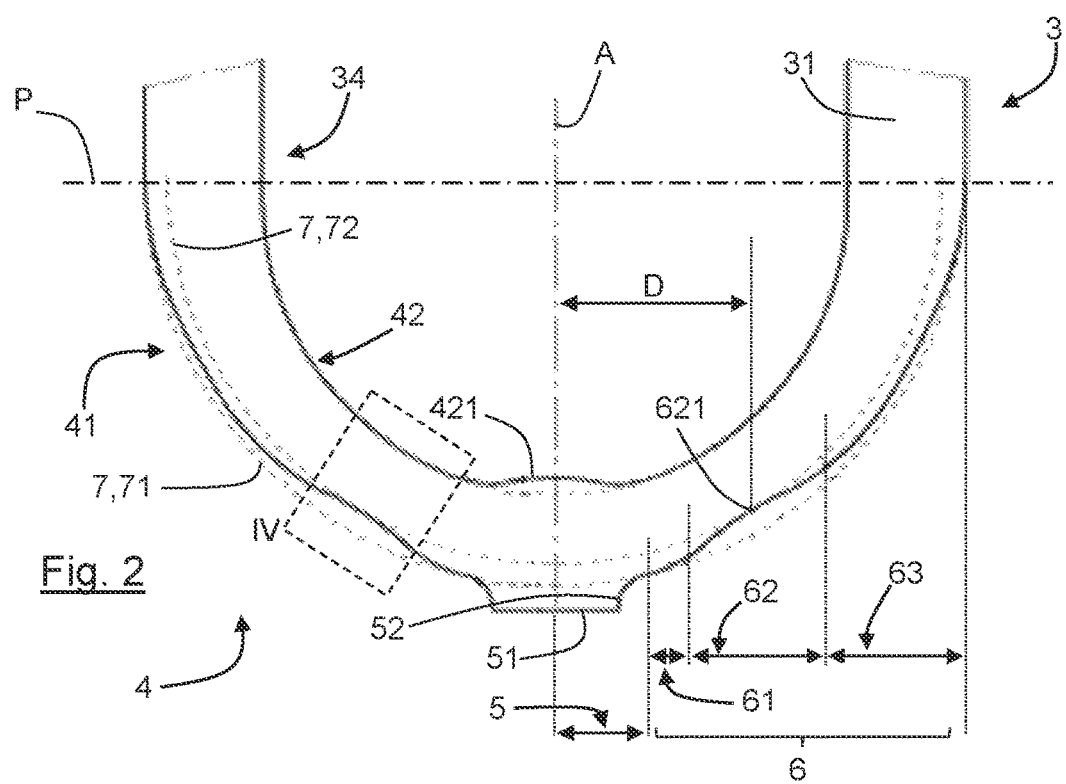

PREFORM FOR A CONTAINER MADE OF PLASTIC MATERIAL

The field of the invention is that of the design and manufacture of containers made of plastics material from preforms.

More specifically, the invention relates to a preform having a bottom that has properties that allow quality containers to be obtained.

Preforms are obtained by injection of their constituent material into an injection mold and each comprise, in a known manner:
- a body having a lateral wall in the form of a cylinder of revolution about an axis of revolution of the preform;
- at a first end of the body, a neck separated from the body by a collar, the neck being intended to form a mouth of the final container and to receive an element for closing the container (for example a cap), the injection-molded neck not undergoing any modification during the process of forming the container;
- at a second end of the body, at the opposite end from the first, a bottom that closes the body, the bottom being intended to form the bottom of the container on which the latter stands.

The body and the bottom of the preform meet at a joining plane that is substantially perpendicular to the axis of revolution of the preform.

Conventionally, a container made of plastics material is obtained by blow-molding (combined in the majority of cases with a stretching step) of a preform in a mold having an internal cavity in the shape of the final container to be obtained.

More specifically, the preforms are first of all heated in a furnace so as to be softened. To this end, the heating is such that the temperature of the material of the preforms exceeds, by a few tens of degrees, the glass transition temperature (Tg) of their constituent material (the preform is for example heated to approximately 120° C. for PET (PolyEthylene Terephthalate), the Tg of which is 70°-77° C.). Next, the preforms are disposed in a mold for a forming step during which the preforms are blow-molded until the final container is formed.

During blow-molding, pressurized air is injected into the preform such that its constituent material flows in the mold until it comes into contact with the internal cavity of the mold, against which it is temporarily held.

When, as in the majority of cases, containers are manufactured by a combination of stretching and blow-molding, a rod called a stretch rod is inserted into the preform so as to stretch the latter toward the bottom of the mold, in addition to the injection of pressurized air into the preform.

During forming (by blow-molding or stretch-blow-molding), it is possible for the material not to flow correctly in the mold. The container obtained can then exhibit structural defects that weaken it and/or mean that it does not have the desired mechanical and esthetic qualities. These forming defects can in particular bring about the creation of cracks in certain regions of the bottom of the container.

These cracks, which are blind at the start, can, in the longer or shorter term and depending on the type of product packaged in the container, develop until they cause product to leak out of the container or even, in certain extreme cases, until they cause the bottom of the container to burst.

This is particularly the case when the container is intended to receive highly carbonated beverages of the "soda" type. Furthermore, the use of chemical products for lubricating post-forming conveying lines, which come into contact with the formed container, can increase the risks of the bottom of the container bursting.

Specifically, a container containing a liquid or a carbonated beverage generally has a bottom of the petaloid type, i.e. a bottom having at its periphery a succession of humps and troughs. The humps form in particular feet on which the container stands once filled.

When the bottom exhibits cracks, these are generally situated on internal edges of the feet, and more particularly at the junction of the feet with a central portion of the bottom of the container.

It is also possible for cracks to appear at the center of the bottom, which corresponds to the point of injection of the material into the injection mold during the manufacture, by molding, of the preform.

It is in this part that there is a high concentration of stresses. In the case of carbonated liquids, the concentration of stresses is due in particular to the presence of carbon in the beverage, which creates a gas pressure.

However, poor distribution of material in the bottom of a formed container (for example too much material in certain regions or, by contrast, too little material in other regions) does not allow the bottom of the container to withstand this concentration of stresses.

Thus, when the container is filled and then capped, the gas contained in the beverage presents a risk to the mechanical integrity of the container, in particular if the latter undergoes impacts, even light impacts, or is subjected to difficult transport and storage conditions (high temperature, or humidity for example) in its distribution chain.

In other words, the gas in the beverage and the pressure exerted by the beverage on the bottom of the container risk creating an excessive load on the cracks, which could lead to tearing (or in extreme cases bursting) of the bottom of the container at the cracks.

Poor distribution of the material in the bottom of the container is not sufficient, on its own, to lead to the presence of cracks. Other phenomena or parameters, such as those listed below, can play an influential role:
- the constituent material of the preform;
- the method for molding the preform;
- the storage conditions of the preforms;
- the storage conditions of the filled containers;
- the conditions of the distribution chain;
- the use of lubricants and the nature thereof on container production lines;
- the shape of the bottom of the containers.

Furthermore, the following two parameters are more particularly emphasized to explain the presence of cracks in the bottom of the formed containers:
- the quality of heating of the preform prior to its conversion into a container;
- the shape of the bottom of the preform.

Specifically, it has been demonstrated that the combination of the shape of the bottom of the preforms and the heating profile, prior to the blow-molding thereof, has a significant impact on the appearance of cracks in the bottom of the formed containers.

The heating profile is directly impacted by the design, and therefore the shape, of the bottom of the preform since an unequal amount of material on the bottom of the preform would require a different heating profile for each part of the bottom of the preform.

In order to overcome problems of heating quality, specific heating profiles have been developed that make it possible to avoid the appearance of what are known as cold regions in the preforms, in which regions it is difficult for the material to flow during the forming of the containers.

These specific heating profiles that have been set up can, however, lead to overconsumption of energy by the installation for forming the containers.

Furthermore, a heating profile suited to the manufacture of one particular type of container is not necessarily suited to other types of container, and so it is necessary to adapt the heating profile to each type of container to be manufactured. In addition, the modification or design of the unit for heating the preforms can lead to a significant cost that is difficult to recoup.

As regards the shape of the bottom of the preforms, the patent document published under the number FR 3 045 434 describes a container preform made of plastics material, comprising:

a cylindrical body extending along an axis of revolution of the preform;

a bottom closing the cylindrical body, the bottom having an outer profile that has a central portion and a curved portion joining the central portion to the cylindrical body, the central portion having, in longitudinal section, a concave section.

Such a shape of the bottom of the preforms makes it possible in particular to limit the cracking phenomena that can be seen in the formed containers, by optimizing the distribution (in other words the flow) of the plastics material in the mold.

However, other shapes of the bottom of the preforms have in particular been considered in order to make it possible to use the preforms to manufacture different containers.

Furthermore, such a preform bottom has a drawback in terms of manufacture.

Specifically, such a shape of the bottom is difficult to obtain; furthermore, the presence of a rounded concave shape does not make the injection-molding of the preforms easier, and so there is a significant risk of defects being present in the preforms thus injection-molded. In particular, such shapes have in particular residual stresses that can impact the mechanical integrity of the bottoms of the containers after forming.

In order to limit or avoid the presence of defects, it may be necessary to considerably reduce the rates of production of the preforms. However, such a reduction in the rates would go against the current demands in industry for an ever greater increase in the rates and therefore a reduction in the cycle time for manufacturing the preforms and/or containers, without it being necessary to increase the size of their range of manufacturing machines.

The document EP2316626A1 presents a preform that substantially improves the problems of cracking. The preform has a bottom having an outer profile that has a central portion and a curved portion joining the central portion to the cylindrical body, the central portion having, in longitudinal section, a first concave section, the curved portion having in succession, in longitudinal section, from the first concave section toward the cylindrical body, a first convex or frustoconical section, a second concave section and a second convex or frustoconical section.

However, the second convex section, which is in fact closest to the body of the preform, has a simple curvature that does not ensure a gradual transition between the body and the second concave section, such that the appearance of cracks is still not excluded since it is possible for the flow not to be optimal.

The aim of the invention is in particular to overcome the drawbacks of the prior art.

More specifically, the aim of the invention is to propose a preform, the bottom of which has a geometry that avoids the formation of cracks during the blow-molding of a container.

Another aim of the invention is to provide such a preform that makes distribution of the material in the mold for manufacturing the container easier, so as to avoid any risk of deformation of the bottom of the container on leaving the mold.

A further aim of the invention is to provide such a preform that does not impact, or has very little impact on, the cycle times for manufacturing, in particular by injection-molding.

These aims, and others that will become apparent below, are achieved by virtue of the invention, the subject of which is a container preform made of plastics material, comprising:

a cylindrical body extending along an axis of revolution of the preform;

a bottom closing the cylindrical body, the bottom having an outer profile that has a central portion and a curved portion joining the central portion to the cylindrical body, the central portion having, in longitudinal section, a first concave section, the curved portion having in succession, in longitudinal section, from the first concave section toward the cylindrical body, a first convex or frustoconical section, a second concave section and a second convex or frustoconical section, wherein the second convex or frustoconical section has in succession, in longitudinal section, from the cylindrical body toward the second concave section, a first radius of curvature, a second radius of curvature and a third radius of curvature and wherein said preform has a plane of intersection defined by the junction between the cylindrical body and the bottom, the plane of intersection being perpendicular to the axis of revolution of the preform, and wherein the value of the first radius of curvature is between 60% and 100% of the value of a radius of the cylindrical body measured on the plane of intersection.

By virtue of this bottom, the preform according to the invention allows better flow of the material during the blow-molding of the container.

Furthermore, for containers with a bottom of the petaloid type, the presence of the second concave section has a shape memory effect, i.e. it makes it easier to create the feet and makes it possible to avoid the sagging of the bottom of the container in its central part.

Specifically, since the junction between the central portion of the bottom and the feet generally has a concave shape, the second concave section is interposed, in the mold, between the central portion and the feet of the container, this making it possible to ensure continuity between the central portion and the feet.

Furthermore, such a preform makes it possible to avoid sagging of the central region of the bottom of the container on leaving the mold, the central region being the region of the bottom that is thickest and therefore most malleable (because of its thermal inertia) on leaving the mold.

In other words, the presence of the second concave section makes it possible to avoid an angular junction between the feet and the central portion, in which it would be difficult for the material to flow and so bring about cracks in the bottom of the blow-molded container.

Furthermore, this second concave section makes it possible to use a "memory function" of the PET in order to limit the sagging of the bottom of the container on leaving the mold, and therefore to limit, or even eliminate, the appearance of cracks.

The succession of the radii of curvature makes it easier for the material to flow against the walls of the bottom of the mold for forming the containers and in particular allows correct formation of the feet of the containers, the feet playing an essential role in the stability of the container on a standing plane.

In order to obtain good blow-molding conditions and in particular good flow of the material, the dimensional values below will preferably be chosen:
- the value of the first radius of curvature is preferentially equal to 77% of the value of a radius of the cylindrical body measured on the plane of intersection;
- the value of the second radius of curvature is less than or equal to the value of a diameter of the cylindrical body measured on the plane of intersection;
- the second concave section has a point of maximum penetration into the preform, situated at a distance from the axis of revolution of the preform, of between 20% and 40%, and preferentially equal to 25%, of a diameter of the cylindrical body measured on the plane of intersection;
- in longitudinal section, the second concave section has a setback, with respect to a hemispherical outline connecting the central portion to the cylindrical body, of between 1% and 35%, and preferentially 20%, of a thickness of the cylindrical body, measured on the plane of intersection;
- the first convex or frustoconical section has a fourth radius of curvature equal to half the first radius of curvature of the second convex or frustoconical section.

Advantageously, the bottom has an inner profile that defines with the second concave section a reduction in the thickness of the bottom.

The reduction in thickness also promotes the flow of the material. This is because the thinner the preform is, the more the material can be stretched axially and radially (with respect to its axis of revolution) by virtue of the pressurized air and/or of the stretching by the stretch rod.

Other features and advantages of the invention will become more clearly apparent on reading the following description of a preferential embodiment of the invention, given by way of illustrative and nonlimiting example, and the appended drawings, in which:

FIG. 1 is a schematic view in cross section of a preform according to the invention;

FIG. 2 is a detail view in cross section, on a larger scale, of a bottom of the preform according to the invention;

Figure 3:
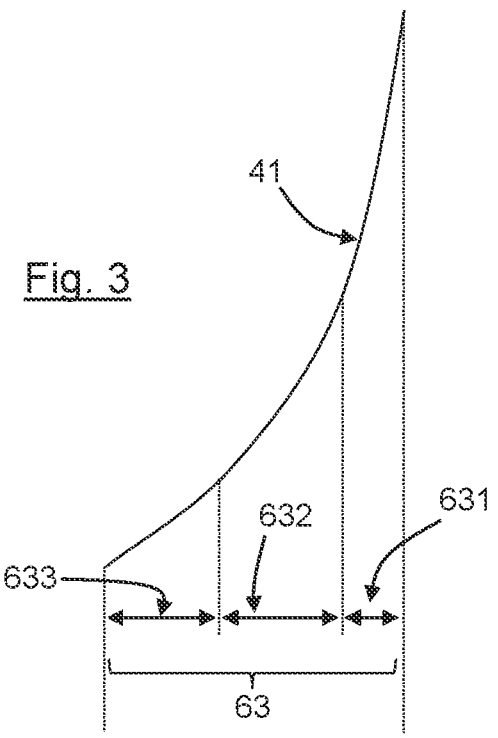
FIG. 3 is a detail view, on a larger scale, of a portion of the outer profile of the bottom of the preform according to the invention.

FIG. 1 shows a preform 1 (also called a blank in certain patent documents or in specialist literature in the field) for producing a container by blow-molding or stretch-blow-molding in a forming unit. The preform 1 is made of a thermoplastic material such as polyethylene terephthalate (PET), this material being able, after having been heated beforehand, to be blow-molded with the aid of a pressurized fluid, typically air, so as to be stretched and pressed against the walls of a mold (not shown) in the shape of the final container.

The preform 1 extends along an axis of revolution A and comprises, from an upper end to a lower end:
- a neck 2;
- a cylindrical body 3;
- a bottom 4.

The neck 2 has an upper end defining a mouth 21 of the final container. Generally, the neck 2 is the part of the preform that preserves its geometry and its dimensions throughout the container forming cycle. In other words, the neck 2 is not intended to be deformed once the preform 1 is obtained, generally by injection-molding.

Beneath the mouth 21, the neck 2 has a thread 22 intended to receive means for capping the container once the latter has been formed and filled with contents. Instead of the thread 22, the neck 2 could be provided with a bulge for receiving a closure cap.

The neck 2 is connected to the cylindrical body 3 by way of a collar 23, which in particular allows the preform 1 to be transported from a loading hopper to a mold of a blow-molding unit, passing through a furnace so as to soften the material of the preform 12 and make it easier to form the container. The collar 23 furthermore allows the container to be transported in phases subsequent to its formation.

The cylindrical body 3 is formed by a wall 31 in the form of a cylinder of revolution about the axis of revolution A of the preform 1. At an upper end 32, the cylindrical body 3 has a shoulder that widens toward the mouth 21. The shoulder 33 in particular provides the junction between the cylindrical body 3 and the neck 2 of the preform.

At a lower end 34, the cylindrical body 3 is extended by the bottom 4, which closes the preform 1. The junction between the cylindrical body 3 and the bottom 4 forms a plane of intersection P, substantially perpendicular to the axis of revolution A of the preform (FIG. 2).

The bottom 4 has an outer profile 41 of the preform 1 and an inner profile 42 of the preform 1.

With reference to FIGS. 2 and 3, the outer profile 41 of the preform 1 comprises a central portion 5 and a curved portion 6 joining the central portion 5 to the cylindrical body 3.

In a view in longitudinal section, as shown in FIG. 2, the central portion 5 has, from the axis of revolution A of the preform 1 toward the cylindrical body 3:
- a pellet 51 (caused by the injection of material into the mold for forming the preforms 1);
- a first concave section 52, between the pellet 51 and the curved portion 6.

The pellet 51 (also called point of injection) is due in particular to the presence of a shut-off member through which the softened plastics material is injected into the mold for manufacturing the preforms 1. This shut-off member forms a cavity in the injection mold, set back from the hemispherical bottom plane of the mold, which explains the presence of the pellet, which forms an over thickness of the bottom 4 toward the outside of the preform.

The curved portion 6, for its part, has in succession, according to the principle of the invention, from the first concave section 52 toward the cylindrical body 3:
- a first convex or frustoconical section 61;
- a second concave section 62;
- a second convex or frustoconical section 63.

It is noted that a concave section means a section that forms, with respect to a tangent to the junction between the immediately preceding section and the concave shape, and with respect to a tangent to the junction between the immediately following section and the concave shape, a material setback. Thus, a frustoconical portion positioned between two convex sections can be considered to be a concave section.

With reference to FIG. 3, the second convex or frustoconical section 63 has in succession, from the cylindrical body 3 toward the second concave section 62, a first radius of curvature 631, a second radius of curvature 632 and a third radius of curvature 633.

Advantageously, the first radius of curvature 631 is between 60% and 100% of a radius of the cylindrical body 3 measured on the plane of intersection P.

By way of example, for a preform 1 comprising a radius of the cylindrical body 3 of 13 mm, measured on the plane of intersection P, the first radius of curvature 631 is at least 7.8 mm and at most 13 mm.

Preferably, the first radius of curvature 631 is between 75% and 80% of the radius of the cylindrical body 3 measured on the plane of intersection P.

Even more preferentially, the target value of the first radius of curvature 631 is 77% of the radius of the cylindrical body 3 measured on the plane of intersection P, i.e. 7.7 mm for a radius of the cylindrical body 3 of 10 mm.

According to a particularly advantageous embodiment, the second radius of curvature 632 is less than or equal to a diameter of the cylindrical body 3 measured on the plane of intersection.

Again advantageously, the second concave section 62 has a point 621 of maximum penetration into the preform 1, situated at a distance D from the axis of revolution A of between 20% and 40% of the diameter of the cylindrical body 3 measured on the plane of intersection P.

Preferably, the point 621 of maximum penetration into the preform 1 is situated at a distance D from the axis of revolution A that is equal to 25% of the diameter of the cylindrical body 3.

Preferentially, the second concave section 62 has a setback, with respect to a hemispherical outline 7 connecting the central portion 5 to the cylindrical body 3, of between 1% and 35% of the thickness of the cylindrical body 3, measured on the plane of intersection P.

As illustrated in FIG. 2, the hemispherical outline 7 comprises a first line 71 defining the setback equal to 1% of the thickness of the cylindrical body 3, and a second line 72 defining the setback according to the illustrated preferred embodiment, i.e. a setback equal to 20% of the thickness of the cylindrical body 3.

As illustrated in FIG. 2, the second concave section 62 has a setback equal to 20% of the thickness of the cylindrical body 3, the maximum setback being reached in particular at the point 621 of maximum penetration.

Advantageously, the first convex or frustoconical section 61 has a fourth radius of curvature equal to half the first radius of curvature 631 of the second convex or frustoconical section 63.

As illustrated in FIG. 2 in particular, the inner profile 42 defines, with the second concave section 62, a reduction in the thickness of the bottom 4.

According to the embodiment illustrated in FIG. 2, the inner profile 42 is of the hemispherical type and has at is center a hump 421 forming a reserve of material that is useful in particular when the preform is stretched by a rod during the forming, in order to avoid a reduction in material thickness that would be harmful to the mechanical integrity of the formed container.

In a variant that is not shown, the inner profile 42 could comprise, opposite the second concave section 62 of the outer profile 41, a concave section (having a radius greater than that of the second concave section 62), a frustoconical section or a convex section, or any combination of convex and/or concave radii of curvature and of frustoconical portions.

Figure 4:
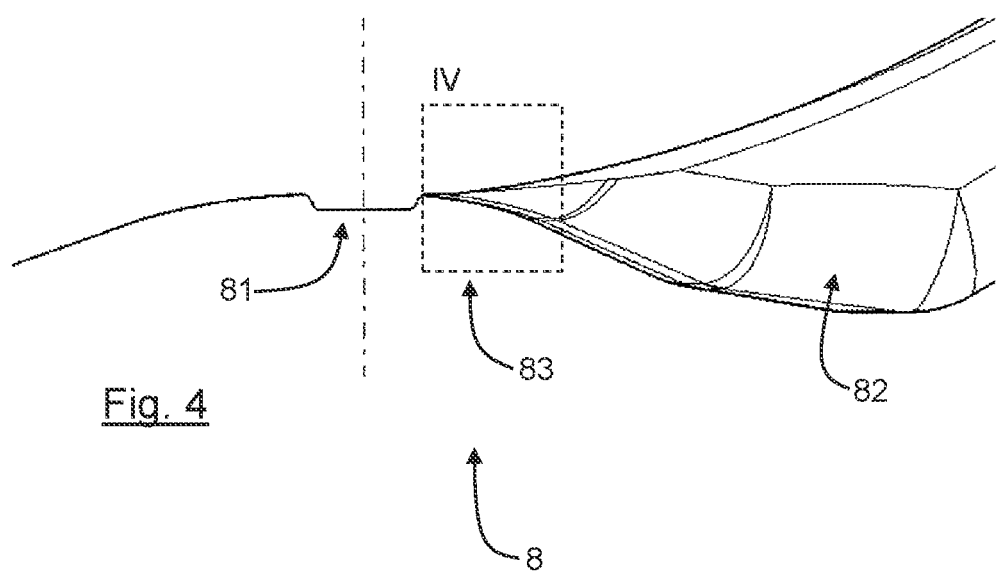
FIG. 4 is a schematic view in cross section of a petaloid container bottom obtained from a preform according to the invention.

FIG. 4 illustrates a container bottom 8 that has a central portion 81 of convex shape and feet 82 (only one being shown) that extend around a periphery radially external to the central portion 81.

The feet 82 are connected to the central portion 81 by way of a concave portion 83 formed by the second concave section 62 of the bottom 4 of the preform 1 (boxes IV in FIGS. 2 and 4).

During the blow-molding of the preform 1 in a mold in order to form the final container, the bottom 4 of the preform 1 is deformed so as to conform to the walls of the mold. The second concave section 62, by virtue of the shape memory of the PET, preserves its concavity so as to perfectly conform to the bottom of the mold and to define the concave portion 83 of the container bottom 8.

By virtue of the presence of the second concave section 62 of the preform 1, the container bottom 8 preserves its shape on leaving the mold. In other words, the second concave section 62 prevents sagging (also called rollout) of the central portion 81 of the container bottom 8 toward the feet 82 at the end of manufacture of the container. Such sagging would be harmful to the container in terms of mechanical integrity, stability and esthetics.

The invention claimed is:

1. A container preform (1) made of plastics material, comprising:
    a cylindrical body (3) extending along an axis of revolution (A) of the preform;
    a bottom (4) closing the cylindrical body (3),
    the bottom (4) having an outer profile (41) that has a central portion (5) and a curved portion (6) joining the central portion (5) to the cylindrical body (3), the central portion (5) having, in longitudinal section, a first concave section (52), the curved portion (6) having in succession, in longitudinal section, from the first concave section (52) toward the cylindrical body (3), a first convex or frustoconical section (61), a second concave section (62) and a second convex or frustoconical section (63), wherein the second convex or frustoconical section (63) has in succession, in longitudinal section, from the cylindrical body (3) toward the second concave section (62), a first radius of curvature (631), a second radius of curvature (632) and a third radius of curvature (633) and wherein said preform has a plane of intersection (P) defined by the junction between the cylindrical body (3) and the bottom (4), the plane of intersection (P) being perpendicular to the axis of revolution (A) of the preform (1), wherein the value of the first radius of curvature (631) is between 60% and 100% of the value of a radius of the cylindrical body (3) measured on the plane of intersection (P), and wherein the value of the second radius of curvature (632) is less than or equal to the value of a diameter of the cylindrical body (3) measured on the plane of intersection (P).

2. The preform (1) as claimed in claim 1, wherein the value of the first radius of curvature (631) is equal to 77% of the value of the radius of the cylindrical body (3) measured on the plane of intersection (P).

3. The preform (1) as claimed in claim 1, wherein the second concave section (62) has a point (621) of maximum penetration into the preform (1), situated at a distance from the axis of revolution (A) of the preform (1) of between 20% and 40% of a diameter of the cylindrical body (3) measured on the plane of intersection (P).

4. The preform (1) as claimed in claim 3, wherein the point (621) of maximum penetration into the preform (1) is situated at a distance from the axis of revolution (A) of the preform (1) that is equal to 25% of the diameter of the cylindrical body (3) measured on the plane of intersection (P).

5. The preform (1) as claimed in claim 1, which has a plane of intersection (P) between the cylindrical body (3) and the bottom (4), the plane of intersection (P) being perpendicular to the axis of revolution (A) of the preform (1), and wherein, in longitudinal section, the second concave section (62) has a setback, with respect to a hemispherical outline (7) connecting the central portion (5) to the cylindrical body (3), of between 1% and 35% of a thickness of the cylindrical body (3), measured on the plane of intersection (P).

6. The preform (1) as claimed in claim 5, wherein the setback of the second concave section (62), with respect to the hemispherical outline (7) connecting the central portion (5) to the cylindrical body (3), is 20% of the thickness of the cylindrical body (3), measured on the plane of intersection (P).

7. The preform (1) as claimed in claim 1, wherein the first convex or frustoconical section (61) has a fourth radius of curvature equal to half the first radius of curvature (631) of the second convex or frustoconical section (63).

8. The preform (1) as claimed in any one of the preceding claims, wherein the bottom (4) has an inner profile (42) that defines with the second concave section (62) a reduction in the thickness of the bottom (4).

9. The preform (1) as claimed in claim 2, wherein the second concave section (62) has a point (621) of maximum penetration into the preform (1), situated at a distance from the axis of revolution (A) of the preform (1) of between 20% and 40% of a diameter of the cylindrical body (3) measured on the plane of intersection (P).

10. The preform (1) as claimed in claim 1, wherein the second concave section (62) has a point (621) of maximum penetration into the preform (1), situated at a distance from the axis of revolution (A) of the preform (1) of between 20% and 40% of a diameter of the cylindrical body (3) measured on the plane of intersection (P).

11. The preform (1) as claimed in claim 2, which has a plane of intersection (P) between the cylindrical body (3) and the bottom (4), the plane of intersection (P) being perpendicular to the axis of revolution (A) of the preform (1), and wherein, in longitudinal section, the second concave section (62) has a setback, with respect to a hemispherical outline (7) connecting the central portion (5) to the cylindrical body (3), of between 1% and 35% of a thickness of the cylindrical body (3), measured on the plane of intersection (P).

12. The preform (1) as claimed in claim 1, which has a plane of intersection (P) between the cylindrical body (3) and the bottom (4), the plane of intersection (P) being perpendicular to the axis of revolution (A) of the preform (1), and wherein, in longitudinal section, the second concave section (62) has a setback, with respect to a hemispherical outline (7) connecting the central portion (5) to the cylindrical body (3), of between 1% and 35% of a thickness of the cylindrical body (3), measured on the plane of intersection (P).

13. The preform (1) as claimed in claim 3, which has a plane of intersection (P) between the cylindrical body (3) and the bottom (4), the plane of intersection (P) being perpendicular to the axis of revolution (A) of the preform (1), and wherein, in longitudinal section, the second concave section (62) has a setback, with respect to a hemispherical outline (7) connecting the central portion (5) to the cylindrical body (3), of between 1% and 35% of a thickness of the cylindrical body (3), measured on the plane of intersection (P).

14. The preform (1) as claimed in claim 4, which has a plane of intersection (P) between the cylindrical body (3) and the bottom (4), the plane of intersection (P) being perpendicular to the axis of revolution (A) of the preform (1), and wherein, in longitudinal section, the second concave section (62) has a setback, with respect to a hemispherical outline (7) connecting the central portion (5) to the cylindrical body (3), of between 1% and 35% of a thickness of the cylindrical body (3), measured on the plane of intersection (P).

15. The preform (1) as claimed in claim 2, wherein the first convex or frustoconical section (61) has a fourth radius of curvature equal to half the first radius of curvature (631) of the second convex or frustoconical section (63).

16. A container preform (1) made of plastics material, comprising:
a cylindrical body (3) extending along an axis of revolution (A) of the preform,
a bottom (4) closing the cylindrical body (3),
the bottom (4) having an outer profile (41) that has a central portion (5) and a curved portion (6) joining the central portion (5) to the cylindrical body (3), the central portion (5) having, in longitudinal section, a first concave section (52), the curved portion (6) having in succession, in longitudinal section, from the first concave section (52) toward the cylindrical body (3), a first convex or frustoconical section (61), a second concave section (62) and a second convex or frustoconical section (63), wherein the second convex or frustoconical section (63) has in succession, in longitudinal section, from the cylindrical body (3) toward the second concave section (62), a first radius of curvature (631), a second radius of curvature (632) and a third radius of curvature (633) and wherein said preform has a plane of intersection (P) defined by the junction between the cylindrical body (3) and the bottom (4), the plane of intersection (P) being perpendicular to the axis of revolution (A) of the preform (1), and wherein the value of the first radius of curvature (631) is between 60% and 100% of the value of a radius of the cylindrical body (3) measured on the plane of intersection (P), and wherein the second concave section (62) has a point (621) of maximum penetration into the preform (1), situated at a distance from the axis of revolution (A) of the preform (1) of between 20% and 40% of a diameter of the cylindrical body (3) measured on the plane of intersection (P).

17. A container preform (1) made of plastics material, comprising:
a cylindrical body (3) extending along an axis of revolution (A) of the preform,
a bottom (4) closing the cylindrical body (3),
the bottom (4) having an outer profile (41) that has a central portion (5) and a curved portion (6) joining the central portion (5) to the cylindrical body (3), the central portion (5) having, in longitudinal section, a first concave section (52), the curved portion (6) having in succession, in longitudinal section, from the first concave section (52) toward the cylindrical body (3), a first convex or frustoconical section (61), a second concave section (62) and a second convex or frustoconical section (63), wherein the second convex or frustoconical section (63) has in succession, in longitudinal section, from the cylindrical body (3) toward the second concave section (62), a first radius of curvature (631), a second radius of curvature (632) and a third radius of curvature (633) and wherein said preform has a plane of intersection (P) defined by the junction between the cylindrical body (3) and the bottom (4), the plane of intersection (P) being perpendicular to the axis of revolution (A) of the preform (1), and wherein the value of the first radius of curvature (631) is between 60% and 100% of the value of a radius of the cylindrical body (3) measured on the plane of intersection (P) and wherein, in longitudinal section, the second concave section (62) has a setback, with respect to a hemispherical outline (7) connecting the central portion (5) to the cylindrical body (3), of between 1% and 35% of a thickness of the cylindrical body (3), measured on the plane of intersection (P).

\* \* \* \* \*